(12) United States Patent
Yang et al.

(10) Patent No.: US 11,128,486 B2
(45) Date of Patent: Sep. 21, 2021

(54) SMART REFRIGERATOR-BASED NETWORKING AND CONTROL METHOD AND SYSTEM, AND SMART REFRIGERATOR

(71) Applicant: HEFEI MIDEA INTELLIGENT TECHNOLOGIES CO., LTD., Hefei (CN)

(72) Inventors: Shenzhen Yang, Hefei (CN); Hailei Chen, Hefei (CN); Tao Ji, Hefei (CN); Yu Yao, Hefei (CN)

(73) Assignee: HEFEI MIDEA INTELLIGENT TECHNOLOGIES CO., LTD., Hefei (CN)

(*) Notice: Subject to any disclaimer, the term of this patent is extended or adjusted under 35 U.S.C. 154(b) by 1 day.

(21) Appl. No.: 16/642,857

(22) PCT Filed: Jun. 13, 2018

(86) PCT No.: PCT/CN2018/090969
§ 371 (c)(1),
(2) Date: Feb. 27, 2020

(87) PCT Pub. No.: WO2019/041962
PCT Pub. Date: Mar. 7, 2019

(65) Prior Publication Data
US 2021/0075636 A1    Mar. 11, 2021

(30) Foreign Application Priority Data
Aug. 28, 2017 (CN) .......................... 201710748471.4

(51) Int. Cl.
*H04L 29/06* (2006.01)
*H04L 9/32* (2006.01)
(Continued)

(52) U.S. Cl.
CPC ........ *H04L 12/2832* (2013.01); *H04L 12/282* (2013.01); *H04L 12/2838* (2013.01);
(Continued)

(58) Field of Classification Search
CPC ............... H04L 12/2838; H04L 12/282; H04L 12/2832; H04L 9/0819; H04L 67/12;
(Continued)

(56) References Cited

U.S. PATENT DOCUMENTS 10,230,522 B1* 3/2019 Roths .................... H04W 76/10
2015/0327304 A1* 11/2015 Tinnakornsrisuphap ....................
H04W 12/06
709/227

(Continued)

FOREIGN PATENT DOCUMENTS

| CN | 106100949 A | 11/2016 |
|----|----|----|
| CN | 106131199 A | 11/2016 |

(Continued)

*Primary Examiner* — Ivan O Latorre
*Assistant Examiner* — Vanneilian Lalchinthang
(74) *Attorney, Agent, or Firm* — Seed IP Law Group LLP

(57) ABSTRACT

The present disclosure provides a smart refrigerator-based networking and control method, a smart refrigerator-based networking and control system, and a smart refrigerator. Wherein the smart refrigerator-based networking and control method for the smart refrigerator comprises obtaining device information of the smart refrigerator; receiving device information and network access request sent by a device to be connected to the network through a Bluetooth assembly; bundling device information of the device to be connected to the network and device information of the smart refrigerator, and generating bundling information; and sending device information of the device to be connected to the network, device information of the smart refrigerator, and the bundling information to a server, so the server responds to the network access request according to device (Continued)

information of the device to be connected to the network, device information of the smart refrigerator, and the bundling information. The present disclosure realizes that the small home appliances and other devices which need to be connected to the network are connected to smart refrigerators through Bluetooth Low Energy technology, and connected to the network through protocol conversion, reducing the connection of Wi-Fi devices at the routing end, reducing routing loads, and enhancing the stability of the star architecture.

13 Claims, 5 Drawing Sheets

(51) Int. Cl.
  *H04L 12/28* (2006.01)
  *H04L 12/44* (2006.01)
  *H04L 29/08* (2006.01)
  *F25D 11/00* (2006.01)
(52) U.S. Cl.
  CPC ............ *H04L 12/44* (2013.01); *H04L 67/125* (2013.01); *F25D 11/00* (2013.01); *H04L 2012/2841* (2013.01)
(58) Field of Classification Search
  CPC ..... H04L 12/44; H04L 67/125; H04L 63/083; H04L 2012/2841; H04L 67/145; H04L 12/2803; H04L 61/2007; H04W 84/18; G06F 21/33; F25D 11/00
  USPC ......................................................... 370/401
  See application file for complete search history.

(56) References Cited

U.S. PATENT DOCUMENTS

| | | | |
|---|---|---|---|
| 2017/0086732 A1* | 3/2017 | Tribble | A61B 5/0022 |
| 2017/0163626 A1* | 6/2017 | Meng | H04W 48/12 |
| 2017/0181060 A1* | 6/2017 | Wang | H04W 8/005 |
| 2017/0230461 A1* | 8/2017 | Verma | H04L 12/2803 |
| 2017/0316412 A1* | 11/2017 | Yang | G06F 21/32 |
| 2017/0366620 A1* | 12/2017 | Zhang | H04L 67/145 |
| 2018/0034772 A1* | 2/2018 | Sun | H04W 12/06 |
| 2018/0324170 A1* | 11/2018 | Chen | H04L 63/0876 |
| 2019/0052476 A1* | 2/2019 | Shu | H04W 4/80 |
| 2020/0366516 A1* | 11/2020 | Moon | H04L 41/22 |

FOREIGN PATENT DOCUMENTS

| | | |
|---|---|---|
| CN | 106679062 A | 5/2017 |
| CN | 106766659 A | 5/2017 |
| CN | 107592245 A | 1/2018 |

* cited by examiner

SMART REFRIGERATOR-BASED NETWORKING AND CONTROL METHOD AND SYSTEM, AND SMART REFRIGERATOR

CROSS-REFERENCES TO RELATED APPLICATIONS

The present disclosure claims the priority of Chinese Patent Application No. 201710748471.4, filed with the Chinese Patent Office on Aug. 28, 2017 and entitled "smart refrigerator-based networking and control method and system, and smart refrigerator", the entire contents of which are herein incorporated by reference.

BACKGROUND

Technical Field

The present disclosure relates to the technical field of refrigerators, and in particular, to a smart refrigerator-based networking and control method, a smart refrigerator-based networking and control system, and a smart refrigerator.

Description of the Related Art

Nowadays, the smart refrigerators are developing rapidly, and the concept of a smart home is deeply rooted in people's hearts. There are many small appliances in the kitchen, and the refrigerators play an important role in the entire kitchen system. At present, home LAN built on Wi-Fi is quite established. Most appliances in the smart home industry are directly connected to the router via Wi-Fi, especially the number of kitchen appliances is large, the routing pressure is heavy and the control is cumbersome. The home LAN built on Wi-Fi is quite established, and sensor networks such as BLE and ZIGBEE in the kitchen being converted into Wi-Fi networks through protocol, and then connected to the Internet has become a trend. So far, no effective solution has been proposed in the industry.

BRIEF SUMMARY

The present disclosure aims to solve at least one of the technical problems in prior art or related technologies.

Therefore, the first aspect of the present disclosure is to provide a smart refrigerator-based networking and control method for the smart refrigerator.

The second aspect of the present disclosure is to provide a smart refrigerator-based networking and control system.

The third aspect of the present disclosure is to provide a smart refrigerator.

In view of this, according to one aspect of the present disclosure, providing a smart refrigerator-based networking and control method for the smart refrigerator, includes obtaining device information of the smart refrigerator; receiving device information and network access request sent by a device to be connected to the network through a Bluetooth assembly; bundling device information of the device to be connected to the network and device information of the smart refrigerator, and generating bundling information; and sending device information of the device to be connected to the network, device information of the smart refrigerator, and the bundling information to a server, so the server responds to the network access request according to the device information of the device to be connected to the network, device information of the smart refrigerator, and the bundling information.

The smart refrigerator-based networking and control method provided by the present disclosure, obtains device information of the smart refrigerator, such as refrigerator barcode, refrigerator model, and refrigerator ID. Then the refrigerator receives device information and network access request sent by the device to be connected to the network, such as smart microwave oven, smart rice cooker, and the like, through the Bluetooth assembly, and bundles device information of the smart refrigerator and the information of the device to be connected to the network to generate bundling information. For example, if the ID of the smart refrigerator is bundled to the ID of the device to be connected to the network, the smart refrigerator then resends its own device information, the received information of the device to be connected to the network and bundling information of the two devices' information to the server. The server responds to the network access request of the device to be connected to the network according to the received device information of the smart refrigerator, device information of the device to be connected to the network, and the bundling information of the smart refrigerator and the device to be connected to the network. In this way, the server to be connected to the network connects the smart refrigerator through BLE (Bluetooth Low Energy Technology), and bundles device information to the smart refrigerator, then connects to the Internet through protocol conversion, so the device to be connected to the network and the smart refrigerator use one ID to connect to the Internet, therefore reducing the Wi-Fi device connection at the routing end, reducing the routing load, and enhancing the stability of the star architecture.

The above-mentioned smart refrigerator-based networking and control method of the present disclosure, further includes the following technical features.

In the above-mentioned technical solution, optionally, before receiving device information and network access request sent by the device to be connected to the network through the Bluetooth assembly, further includes turning on the Bluetooth assembly of the smart refrigerator to connect to the Bluetooth assembly of the device to be connected to the network; and confirming that the smart refrigerator is a Bluetooth master device connected by Bluetooth.

In the technical solution, before the smart refrigerator receives device information and network access request sent by the device to be connected to the network through Bluetooth, first, the Bluetooth assembly of the smart refrigerator is turned on to connect to the Bluetooth assembly of the device to be connected to the network. After that, the process of Bluetooth distribution network connection starts, where the Bluetooth link formation consists of two process modes Inquiry and Page. Each node alternates between the Inquiry mode and Inquiry scan mode. The Bluetooth node has the variables WEIGHT, BACK, TIMEOUT, and FHS (File System Hierarchy Standard) packet. The process of connecting to the Bluetooth distribution network includes first, the Bluetooth initialization is periodically switched to the Inquiry mode and Inquiry scan mode to discover other devices or to be found by other devices; second, determining the TIMEOUT value and, after the Bluetooth nodes in the relative mode discover each other, comparing the WEIGHT value such that the party with the smaller WEIGHT value passes the FHS packet to the party with the larger WEIGHT value, and starts the Page scan state. After the party with the larger WEIGHT value receives the FHS packet from the other party, it resets the TIMEOUT and continues with the Inquiry mode or Inquiry scan mode. The above operations iterate until TIMEOUT is 0, and the Page mode starts, and the master node is determined. Through the above process of Bluetooth distribution network connection, the smart refrigerator is confirmed as a Bluetooth master device connected by Bluetooth so the smart refrigerator receives device information and network access request of the device to be connected to the network. The smart refrigerator, as a Bluetooth master device connected by Bluetooth, finally implements the control of the device to be connected to the network through the Bluetooth connection.

Any of the above-mentioned technical solutions, optionally, after obtaining device information of the smart refrigerator, before turning on the Bluetooth assembly of the smart refrigerator to connect to the Bluetooth assembly of the device to be connected to the network, further includes receiving ID information of a registration terminal; and sending ID information of the registration terminal and device information of the smart refrigerator to the server, to bundle the registration terminal and the smart refrigerator.

In the technical solution, after obtaining device information of the smart refrigerator, before turning on the Bluetooth assembly of the smart refrigerator to connect to the Bluetooth assembly of the device to be connected to the network, that is, before the smart refrigerator starts to connect to the device to be connected to the network, it first receives ID information of the registration terminal. The registration terminal can be a smart phone, a computer, a tablet, a wearable bracelet and other terminals, and a control APP for controlling smart home appliances is installed thereon, and ID information of the registration terminal and device information of the smart refrigerator are sent to the server, to bundle the registration terminal and the smart refrigerator, to realize the control of the smart refrigerator through the registered smart terminal.

Any of the above-mentioned technical solutions, optionally, after sending ID information of the registration terminal and device information of the smart refrigerator to the server, to bundle the registration terminal and the smart refrigerator, further includes determining whether a return data of the server is received; if the return data of the server is received, receiving the device information and the network access request sent by the device to be connected to the network through the Bluetooth assembly; and if the return data of the server is not received, resending ID information of the registration terminal and the device information of the smart refrigerator to the server.

In the technical solution, after sending ID information of the registration terminal and device information of the smart refrigerator to the server to bundle the registration terminal and the smart refrigerator, it is necessary to determine whether the server returns the data for the sent data. If the return data of the server is received, it means the registration of the registration terminal is successful, and the smart refrigerator is successfully bundled, and then it receives device information and network access request sent by the device to be connected to the network through Bluetooth, to realize the control of the device to be connected to the network through the smart refrigerator. If the return data of the server is not received, it means the registration and bundling are not successful. Then, ID information of the registration terminal and device information of the smart refrigerator are resent to the server, to achieve registration and bundling again.

Any of the above-mentioned technical solutions, optionally, after sending device information of the device to be connected to the network, device information of the smart refrigerator, and bundling information to the server, so the server responds to the network access request according to device information of the device to be connected to the network, device information of the smart refrigerator, and the bundling information, further includes receiving a control instruction of the registration terminal to control the device to be connected to the network according to the control instruction.

In the technical solution, after the smart refrigerator sends device information of the device to be connected to the network, device information of the smart refrigerator, and bundling information to the server, so the server responds to the network access request according to device information of the device to be connected to the network, device information of the smart refrigerator, and the bundling information, that is, after the device to be connected to the network is connected to the smart refrigerator via BLE and connected to the Internet through a protocol conversion, receiving a control instruction of the registration terminal to control the device to be connected to the network according to the control instruction. So that realized, that the refrigerator controls the device to be connected to the network by one button, the control process is simple, the working efficiency of the device to be connected to the network is improved, and the user experience is improved.

The second aspect of the present disclosure, providing a smart refrigerator-based networking and control system for the smart refrigerator, includes an obtaining unit used to obtain device information of the smart refrigerator; a first receiving unit used to receive device information and network access request sent by a device to be connected to the network through a Bluetooth assembly; a bundling unit used to bundle device information of the device to be connected to the network and device information of the smart refrigerator, and generate bundling information; and a first sending unit used to send device information of the device to be connected to the network, device information of the smart refrigerator, and the bundling information to a server, so the server responds to the network access request according to device information of the device to be connected to the network, device information of the smart refrigerator, and the bundling information.

In the smart refrigerator-based networking and control system provided by the present disclosure, the obtaining unit obtains device information of the smart refrigerator, such as refrigerator barcode, refrigerator model, and refrigerator ID. Then, the first receiving unit of the refrigerator receives device information and network access request sent by the device to be connected to the network, such as a smart microwave oven, a smart rice cooker, and the like, through the Bluetooth assembly, and the bundling unit bundles device information of the smart refrigerator and the information of the device to be connected to the network to generate bundling information. For example, if the ID of the smart refrigerator is bundled to the ID of the device to be connected to the network, the first sending unit of the smart refrigerator then resends its own device information, the received information of the device to be connected to the network and bundling information of the two devices' information to the server. The server responds to the network access request of the device to be connected to the network according to the received device information of the smart refrigerator, device information of the device to be connected to the network, and the bundling information of the smart refrigerator and the device to be connected to the network. In this way, the server to be connected to the network connects the smart refrigerator through BLE (Bluetooth Low Energy Technology), and bundles device information to the smart refrigerator, then connects to the Internet through protocol conversion, so the device to be connected to the network and the smart refrigerator use one ID to connect to the Internet, therefore reducing the Wi-Fi device connection at the routing end, reducing the routing load, and enhancing the stability of the star architecture.

The above-mentioned smart refrigerator-based networking and control system, further includes the following technical features.

In the above-mentioned technical solution, optionally, the smart refrigerator-based networking and control system, further includes an enabling unit used to turn on the Bluetooth assembly of the smart refrigerator to connect to the Bluetooth assembly of the device to be connected to the network; and a confirming unit used to confirm that the smart refrigerator is a Bluetooth master device connected by Bluetooth.

In the technical solution, before the smart refrigerator receives device information and network access request sent by the device to be connected to the network through Bluetooth, first, the enabling unit turns on the Bluetooth assembly of the smart refrigerator to connect to the Bluetooth assembly of the device to be connected to the network. After that, the smart refrigerator enter into the process of connecting to Bluetooth distribution network, the Bluetooth link formation consists of two processes Inquiry and page, each node alternates between Inquiry mode and Inquiry scan mode. The Bluetooth node has the variables WEIGHT, BACK, TIMEOUT, and FHS (File System Hierarchy Standard) packet. The process of connecting to the Bluetooth distribution network connection includes first, the Bluetooth initialization is periodically switched to the Inquiry mode and Inquiry scan mode to discover other devices or be found; second, determining the TIMEOUT value and, after the Bluetooth nodes in the relative mode discover each other, comparing the WEIGHT value, the party with the smaller WEIGHT value passes the FHS packet to the party with the larger WEIGHT value, and enters into the Page scan state. After the party with the larger WEIGHT value receives the FHS packet from the other party, resetting TIMEOUT and continuing to enter into the Inquiry mode or Inquiry scan mode. Repeat until TIMEOUT is 0, entering into Page mode, and confirming the master node. Through the above process of Bluetooth distribution network connection, the confirming unit confirms that the smart refrigerator is a Bluetooth master device connected by Bluetooth, so the smart refrigerator receives device information and network access request of the device to be connected to the network. The smart refrigerator, as a Bluetooth master device connected by Bluetooth, finally implements the control of the device to be connected to the network through the Bluetooth connection.

In any of the above-mentioned technical solutions, optionally, the smart refrigerator-based networking and control system further includes a second receiving unit used to receive ID information of a registration terminal; and a second sending unit used to send ID information of the registration terminal and device information of the smart refrigerator to the server, to bundle the registration terminal and the smart refrigerator.

In the technical solution, after obtaining device information of the smart refrigerator, before turning on the Bluetooth assembly of the smart refrigerator to connect to the Bluetooth assembly of the device to be connected to the network, that is, before the smart refrigerator starts to connect to the device to be connected to the network, first, the second receiving unit receives ID information of the registration terminal. The registration terminal can be a smart phone, a computer, a tablet, a wearable bracelet and other terminals, and a control APP for controlling smart home appliances is installed thereon. ID information of the registration terminal and device information of the smart refrigerator are sent to the server, to bundle the registration terminal and the smart refrigerator by the second sending unit, to realize the control of the smart refrigerator through the registered smart terminal.

In any of the above-mentioned technical solutions, optionally, the smart refrigerator-based networking and control system, further includes a judgment unit used to determine whether a return data of the server is received; the first receiving unit is specifically used to receive the device information and the network access request sent by the device to be connected to the network through the Bluetooth assembly if the return data of the server is received; and the second sending unit is further used to resend ID information of the registration terminal and the device information of the smart refrigerator to the server if the return data of the server is not received.

In the technical solution, after sending ID information of the registration terminal and device information of the smart refrigerator to the server, to bundle the registration terminal and the smart refrigerator, the judgment unit needs to determine whether the server returns the data for the sent data. If the return data of the server is received, it means the registration of the registration terminal is successful, and the smart refrigerator is successfully bundled, and then the first receiving unit receives device information and network access request sent by the device to be connected to the network through Bluetooth, to realize the control of the device to be connected to the network through the smart refrigerator. If the return data of the server is not received, it means the registration and bundling are not successful. Then the second sending unit resends ID information of the registration terminal and device information of the smart refrigerator to the server, to achieve registration and bundling again.

In any of the above-mentioned technical solutions, optionally, the smart refrigerator-based networking and control system further includes a control unit used to receive a control instruction of the registration terminal to control the device to be connected to the network according to the control instruction.

In the technical solution, after the smart refrigerator sends device information of the device to be connected to the network, device information of the smart refrigerator, and bundling information to the server, so the server responds to the network access request according to device information of the device to be connected to the network, device information of the smart refrigerator, and the bundling information, that is, after the device to be connected to the network is connected to the smart refrigerator via BLE and connected to the Internet through a protocol conversion, the control unit receives a control instruction of the registration terminal to control the device to be connected to the network according to the control instruction. So that realized, that the refrigerator controls the device to be connected to the network by one button, the control process is simple, the working efficiency of the device to be connected to the network is improved, and the user experience is improved.

The third aspect of the present disclosure, providing a smart refrigerator, includes the smart refrigerator-based networking and control system according to any one of the above-mentioned technical solutions.

The smart refrigerator provided by the present disclosure includes the smart refrigerator-based networking and control system according to any one of the above-mentioned technical solutions, therefore it has all the beneficial effects of the smart refrigerator-based networking and control system, and will not be repeated here.

Additional aspects and advantages of the present disclosure will become apparent in the following description, or are understood by the practice of the present disclosure.

BRIEF DESCRIPTION OF THE SEVERAL VIEWS OF THE DRAWINGS

The above and/or additional aspects and advantages of the present disclosure will become apparent and readily understood from the following description of embodiments in conjunction with the drawings.

DETAILED DESCRIPTION

In order that the above-mentioned objectives, features and advantages of the present disclosure can be understood more clearly, a further detailed description of the present disclosure will be given below in connection with the accompanying drawings and specific embodiments. It should be noted that the embodiments of the present disclosure and the features in the embodiments can be combined with each other if there is no conflict.

In the following description, numerous specific details are set forth in order to provide a thorough understanding of the present disclosure. However, the present disclosure can also be implemented in other manners than those described herein. Therefore, the protection scope of the present disclosure is not limited to the specific embodiments disclosed below.

Figure 1:
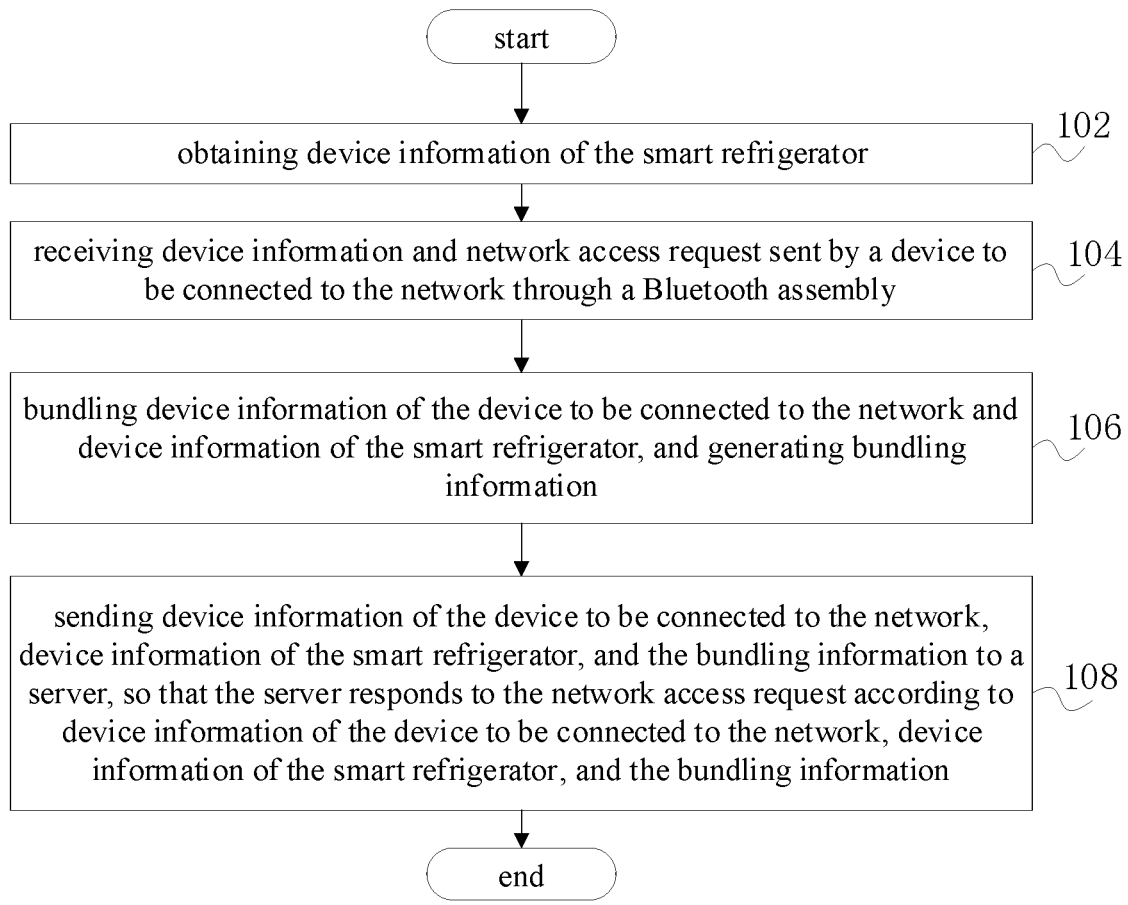
FIG. 1 shows a schematic flowchart of a smart refrigerator-based networking and control method according to an embodiment of the present disclosure.

In an embodiment of the first aspect of the present disclosure, providing a smart refrigerator-based networking and control method for the smart refrigerator, FIG. 1 shows a schematic flowchart of a smart refrigerator-based networking and control method according to an embodiment of the present disclosure, comprising:

Step 102: obtaining device information of the smart refrigerator;

Step 104: receiving device information and network access request sent by a device to be connected to the network through a Bluetooth assembly;

Step 106: bundling device information of the device to be connected to the network and device information of the smart refrigerator, and generating bundling information; and Step 108: sending device information of the device to be connected to the network, device information of the smart refrigerator, and the bundling information to a server, so the server responds to the network access request according to device information of the device to be connected to the network, device information of the smart refrigerator, and the bundling information.

The smart refrigerator-based networking and control method provided by the present disclosure obtains device information of the smart refrigerator, such as refrigerator barcode, refrigerator model, refrigerator ID. Then the refrigerator receives device information and network access request sent by the device to be connected to the network, such as a smart microwave oven, a smart rice cooker, and the like, through the Bluetooth assembly, and bundles device information of the smart refrigerator and the information of the device to be connected to the network to generate bundling information. For example, if the ID of the smart refrigerator is bundled to the ID of the device to be connected to the network, the smart refrigerator then resends its own device information, the received information of the device to be connected to the network and bundling information of the two devices' information to the server. The server responds to network access request of the device to be connected to the network according to the received device information of the smart refrigerator, device information of the device to be connected to the network, and the bundling information of the smart refrigerator and the device to be connected to the network. In this way, the server to be connected to the network connects the smart refrigerator through BLE (Bluetooth Low Energy Technology), and bundles device information to the smart refrigerator, then connects to the Internet through protocol conversion, so the device to be connected to the network and the smart refrigerator use one ID to connect to the Internet, therefore reducing the Wi-Fi device connection at the routing end, reducing the routing load, and enhancing the stability of the star architecture.

Figure 2:
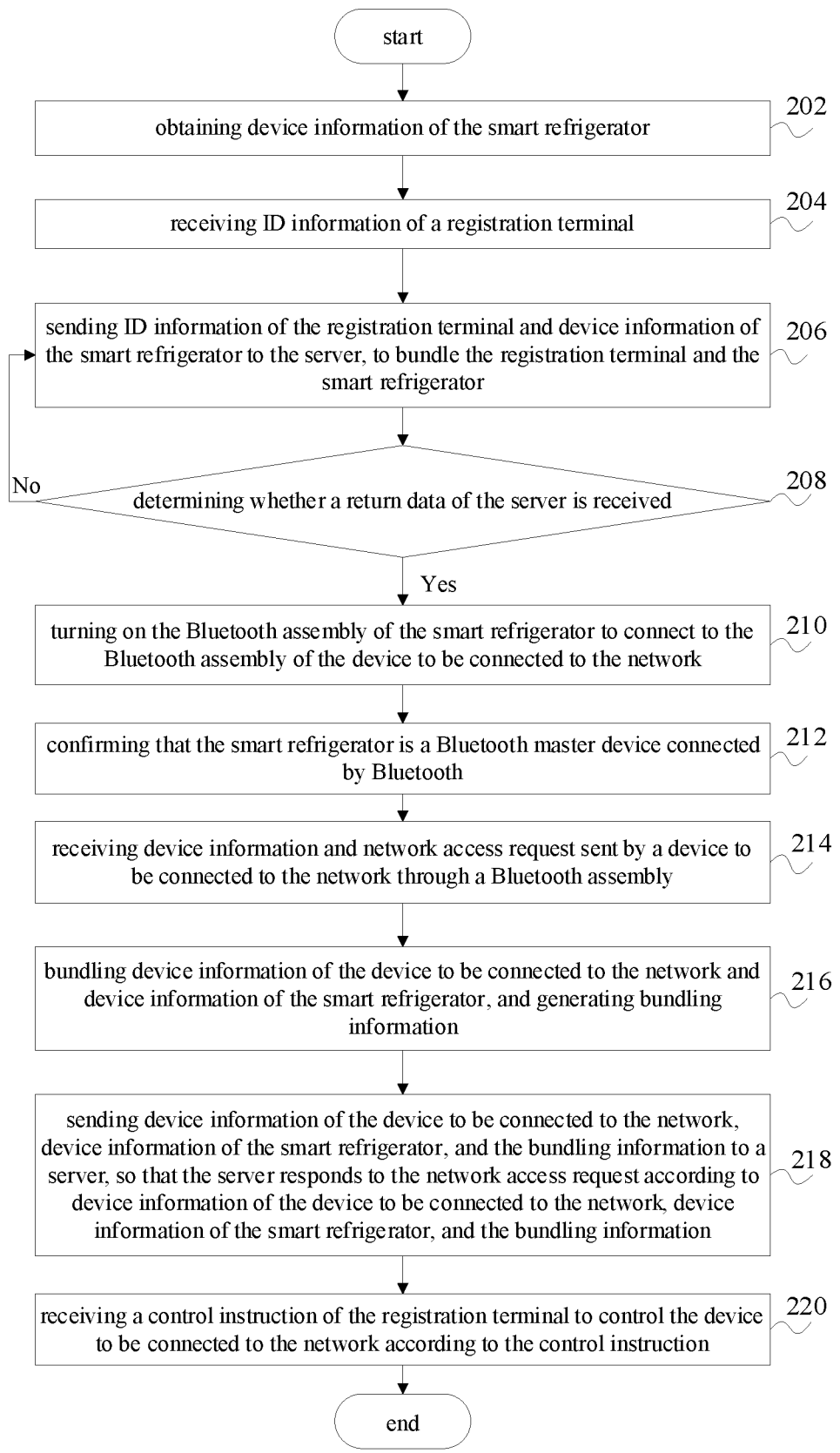
FIG. 2 shows a schematic flowchart of a smart refrigerator-based networking and control method according to another embodiment of the present disclosure.

FIG. 2 shows a schematic flowchart of a smart refrigerator-based networking and control method according to another embodiment of the present disclosure. Wherein the method comprises:

Step 202: obtaining device information of the smart refrigerator;

Step 204: receiving ID information of a registration terminal;

Step 206: sending ID information of the registration terminal and device information of the smart refrigerator to the server, to bundle the registration terminal and the smart refrigerator;

Step 208: determining whether a return data of the server is received, if yes, go to step 210; if not, repeat step 206;

Step 210: turning on the Bluetooth assembly of the smart refrigerator to connect to the Bluetooth assembly of the device to be connected to the network;

Step 212: confirming that the smart refrigerator is a Bluetooth master device connected by Bluetooth;

Step 214: receiving device information and network access request sent by a device to be connected to the network through a Bluetooth assembly;

Step 216: bundling device information of the device to be connected to the network and device information of the smart refrigerator, and generating bundling information;

Step 218: sending device information of the device to be connected to the network, device information of the smart refrigerator, and the bundling information to a server, so the server responds to the network access request according to device information of the device to be connected to the network, device information of the smart refrigerator, and the bundling information; and Step 220: receiving a control instruction of the registration terminal to control the device to be connected to the network according to the control instruction.

One embodiment of the present disclosure, optionally, before receiving device information and network access request sent by the device to be connected to the network through the Bluetooth assembly, further comprises turning on the Bluetooth assembly of the smart refrigerator to connect to the Bluetooth assembly of the device to be connected to the network; and confirming that the smart refrigerator is a Bluetooth master device connected by Bluetooth.

In this embodiment, before the smart refrigerator receives device information and network access request sent by the device to be connected to the network through Bluetooth, first, it is necessary to turn on the Bluetooth assembly of the smart refrigerator to connect to the Bluetooth assembly of the device to be connected to the network. After that, the smart refrigerator enters into the process of connecting to Bluetooth distribution network, the Bluetooth link formation consists of two processes Inquiry and page, each node alternates between Inquiry mode and Inquiry scan mode. The Bluetooth node has the variables WEIGHT, BACK, TIMEOUT, and FHS (File System Hierarchy Standard) packet. The process of entering the Bluetooth distribution network connection includes first, the Bluetooth initialization is periodically switched to the Inquiry mode and Inquiry scan mode to discover other devices or be found; second, determining the TIMEOUT value, and after the Bluetooth nodes in the relative mode discover each other, comparing the WEIGHT value, the party with the smaller WEIGHT value passes the FHS packet to the party with the larger WEIGHT value, and enters into the Page scan state. After the party with the larger WEIGHT value receives the FHS packet from the other party, resetting TIMEOUT and continuing to enter into the Inquiry mode or Inquiry scan mode. Repeat until TIMEOUT is 0, entering into the Page mode, and confirming the master node. Through the above process of Bluetooth distribution network connection, confirming that the smart refrigerator is a Bluetooth master device connected by Bluetooth so the smart refrigerator receives device information and network access request of the device to be connected to the network. The smart refrigerator, as a Bluetooth master device connected by Bluetooth, finally implements the control of the device to be connected to the network through the Bluetooth connection.

One embodiment of the present disclosure, optionally, after obtaining device information of the smart refrigerator, before turning on the Bluetooth assembly of the smart refrigerator to connect to the Bluetooth assembly of the device to be connected to the network, further comprises receiving ID information of a registration terminal; and sending ID information of the registration terminal and device information of the smart refrigerator to the server, to bundle the registration terminal and the smart refrigerator.

In this embodiment, after obtaining device information of the smart refrigerator, before turning on the Bluetooth assembly of the smart refrigerator to connect to the Bluetooth assembly of the device to be connected to the network, that is, before the smart refrigerator starts to connect to the device to be connected to the network, it first receives ID information of the registration terminal. The registration terminal can be a smart phone, a computer, a tablet, a wearable bracelet and other terminals, and a control APP for controlling smart home appliances is installed thereon, and ID information of the registration terminal and device information of the smart refrigerator are sent to the server, to bundle the registration terminal and the smart refrigerator, to realize the control of the smart refrigerator through the registered smart terminal.

One embodiment of the present disclosure, optionally, after sending ID information of the registration terminal and device information of the smart refrigerator to the server, to bundle the registration terminal and the smart refrigerator, further comprises determining whether a return data of the server is received; if the return data of the server is received, receiving the device information and the network access request sent by the device to be connected to the network through the Bluetooth assembly; and if the return data of the server is not received, resending ID information of the registration terminal and the device information of the smart refrigerator to the server.

In this embodiment, after sending ID information of the registration terminal and device information of the smart refrigerator to the server, to bundle the registration terminal and the smart refrigerator, it is necessary to determine whether the server returns the data for the sent data. If the return data of the server is received, it means the registration of the registration terminal is successful, and the smart refrigerator is successfully bundled, and then it receives device information and network access request sent by the device to be connected to the network through Bluetooth, to realize the control of the device to be connected to the network through the smart refrigerator. If the return data of the server is not received, it means the registration and bundling are not successful. Then ID information of the registration terminal and device information of the smart refrigerator are resent to the server, to achieve registration and bundling again.

One embodiment of the present disclosure, optionally, after sending device information of the device to be connected to the network, device information of the smart refrigerator, and bundling information to the server, so the server responds to the network access request the according to device information of the device to be connected to the network, device information of the smart refrigerator, and the bundling information, further comprises receiving a control instruction of the registration terminal to control the device to be connected to the network according to the control instruction.

In this embodiment, after the smart refrigerator sends device information of the device to be connected to the network, device information of the smart refrigerator, and bundling information to the server, so the server responds to the network access request according to device information of the device to be connected to the network, device information of the smart refrigerator, and the bundling information, that is, after the device to be connected to the network is connected to the smart refrigerator via BLE and connected to the Internet through a protocol conversion, receiving a control instruction of the registration terminal to control the device to be connected to the network according to the control instruction. So that realized, that the refrigerator controls the device to be connected to the network by one button, the control process is simple, the working efficiency of the device to be connected to the network is improved, and the user experience is improved.

Hereinafter, the smart refrigerator-based networking and control method according to a specific embodiment of the present disclosure will be described with reference to FIGS. 3 and 4.

Figure 3:
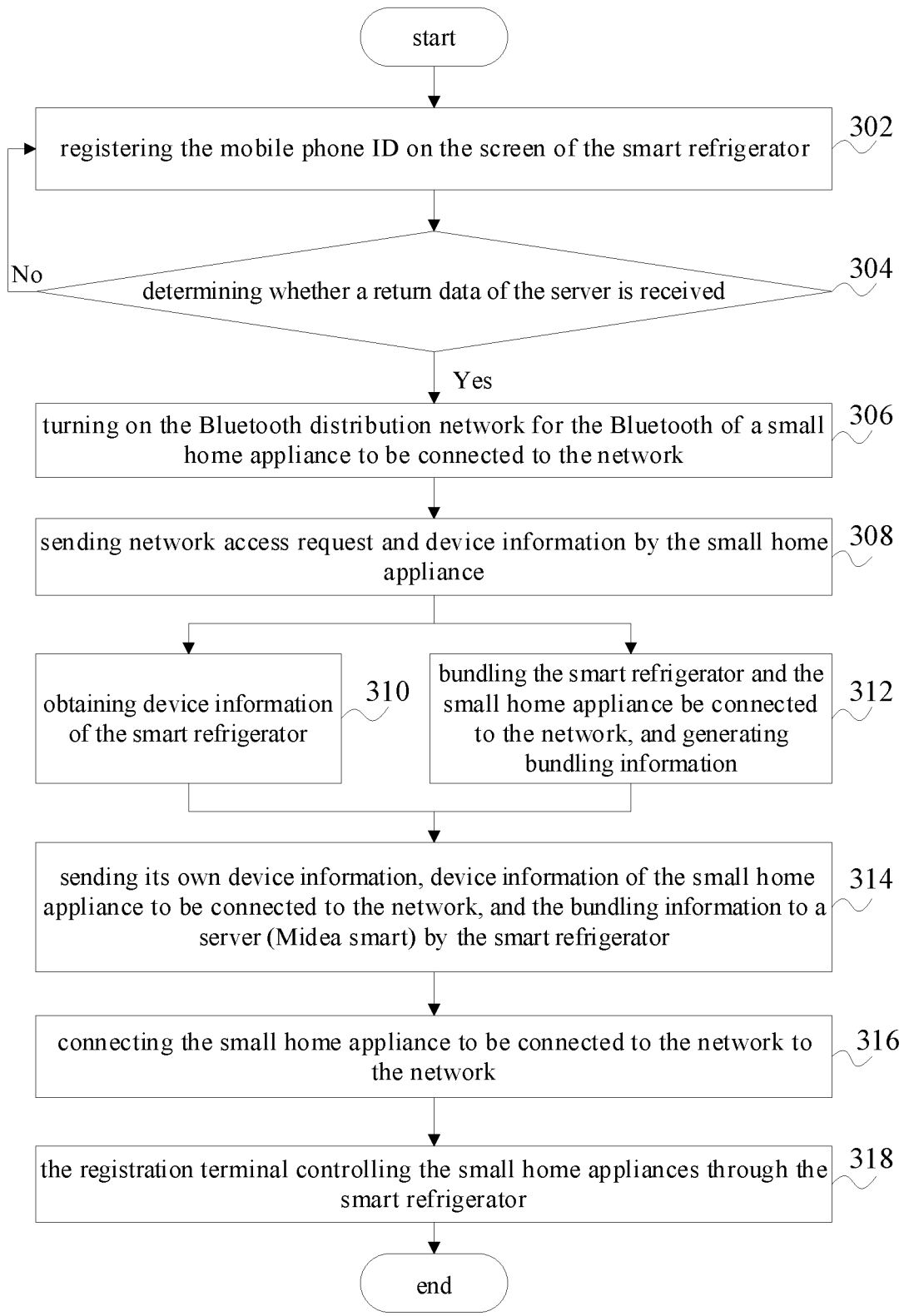
FIG. 3 shows a schematic flowchart of a smart refrigerator-based networking and control method according to a specific embodiment of the present disclosure.

As shown in FIG. 3, the flow of the smart refrigerator-based networking and control method according to a specific embodiment of the present disclosure comprises:

Step 302: registering the mobile phone ID on the screen of the smart refrigerator;

Step 304: determining whether the server returns data, if yes, go to step 306; if not, repeat step 302;

Step 306: turning on the Bluetooth distribution network for Bluetooth of a small home appliance to be connected to the network;

Step 308: sending network access request and device information by the small home appliance;

Step 310: obtaining device information of the smart refrigerator;

Step 312: bundling the smart refrigerator and the small home appliance be connected to the network, and generating bundling information;

Step 314: sending its own device information, device information of the small home appliance to be connected to the network, and the bundling information to a server (Midea smart) by the smart refrigerator;

Step 316: connecting the small home appliance to be connected to the network to the network; and Step 318: the registration terminal controlling the small home appliances through the smart refrigerator.

Figure 4:
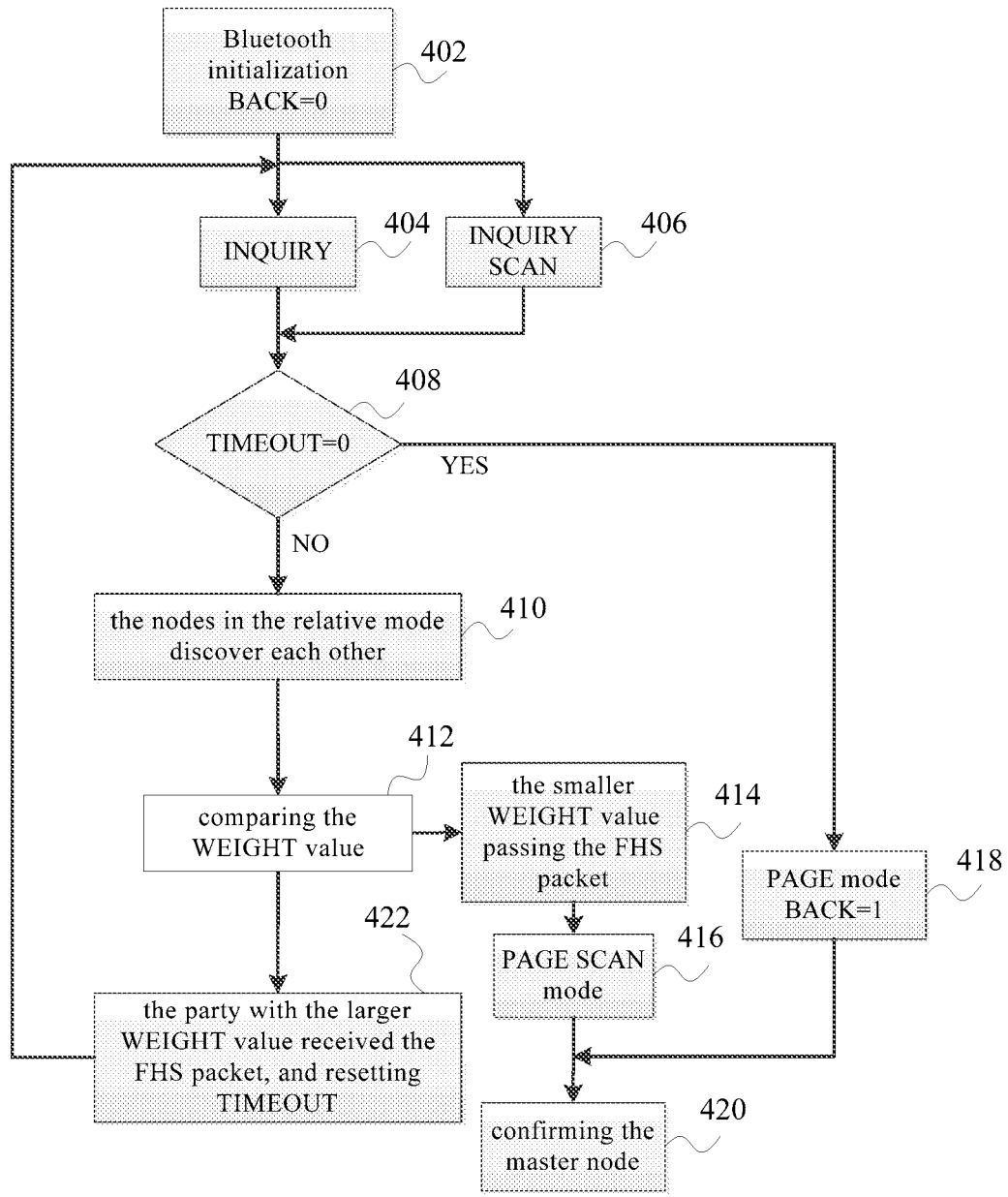
FIG. 4 shows a schematic flowchart of a smart refrigerator and a method for Bluetooth distribution network of a device to be connected to the network according to an embodiment of the present disclosure.

Wherein, in Step 306, the specific detailed process of the Bluetooth of the small home appliance to be connected to the network turns on the Bluetooth distribution network (periodically enters into the INQUIRY mode and INQUIRY SCAN mode, as shown in FIG. 4. The Bluetooth link formation consists of two processes Inquiry and page, each node alternates between Inquiry mode and Inquiry scan mode. The Bluetooth node has the variables WEIGHT, BACK, TIMEOUT, and FHS (File System Hierarchy Standard) packet. The process of connecting to the Bluetooth distribution network includes first, the Bluetooth initialization is periodically switched to the Inquiry mode and Inquiry scan mode to discover other devices or be found; second, determining the TIMEOUT value and, after the Bluetooth nodes in the relative mode discover each other, comparing the WEIGHT value, the party with the smaller WEIGHT value passes the FHS packet to the party with the larger WEIGHT value, and entering into the Page scan state. After the party with the larger WEIGHT value receives the FHS packet from the other party, resetting TIMEOUT and continuing to operate under the Inquiry mode or Inquiry scan mode. Repeat until TIMEOUT is 0, entering into Page mode, and confirming the master node.

In the smart refrigerator-based networking and control method provided by this specific embodiment, the small appliance is connected to the smart refrigerator via BLE, and the appliance's working efficiency is improved by a one-button control of the refrigerator, the device BLE is connected to the smart refrigerator, and connected to the Internet through protocol conversion, therefore reducing the Wi-Fi device connection at the routing end, reducing the routing load, and enhancing the stability of the star architecture.

Figure 5:
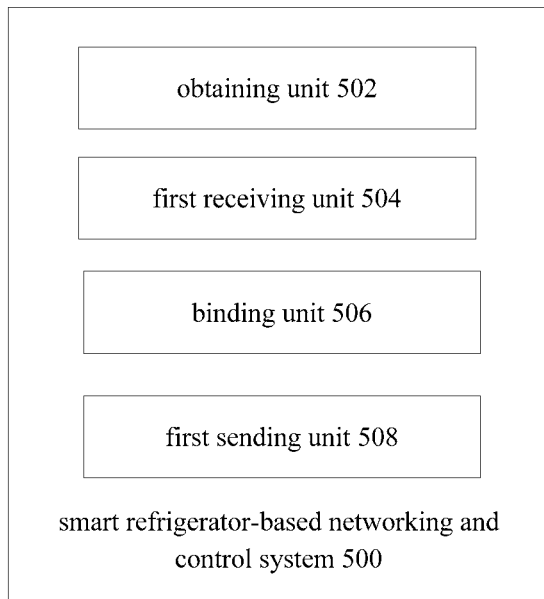
FIG. 5 shows a schematic block diagram of a smart refrigerator-based networking and control system according to an embodiment of the present disclosure.

According to the second aspect of the embodiment, providing a smart refrigerator-based networking and control system 500 for the smart refrigerator, FIG. 5 shows a schematic block diagram of a smart refrigerator-based networking and control system according to an embodiment of the present disclosure, comprising:

an obtaining unit 502 used to obtain device information of the smart refrigerator;

a first receiving unit 504 used to receive device information and network access request sent by a device to be connected to the network through a Bluetooth assembly;

a bundling unit 506 used to bundle device information of the device to be connected to the network and device information of the smart refrigerator, and generate bundling information; and a first sending unit 508 used to send device information of the device to be connected to the network, device information of the smart refrigerator, and the bundling information to a server, so the server responds to the network access request according to device information of the device to be connected to the network, device information of the smart refrigerator, and the bundling information.

In the smart refrigerator-based networking and control system 500 provided by the present disclosure, the obtaining unit 502 obtains device information of the smart refrigerator, such as refrigerator barcode, refrigerator model, and refrigerator ID. Then the first receiving unit 504 of the refrigerator receives device information and network access request sent by the device to be connected to the network, such as a smart microwave oven, a smart rice cooker, and the like, through the Bluetooth assembly, and the bundling unit 506 bundles device information of the smart refrigerator and the information of the device to be connected to the network to generate bundling information. For example, if the ID of the smart refrigerator is bundled to the ID of the device to be connected to the network, the first sending unit 508 of the smart refrigerator then resends its own device information, the received information of the device to be connected to the network, and bundling information of the two devices' information to the server. The server responds to network access request of the device to be connected to the network according to the received device information of the smart refrigerator, device information of the device to be connected to the network, and the bundling information of the smart refrigerator and the device to be connected to the network. In this way, the server to be connected to the network connects the smart refrigerator through BLE (Bluetooth Low Energy Technology), and bundles device information to the smart refrigerator, then connects to the Internet through protocol conversion, so the device to be connected to the network and the smart refrigerator use one ID to connect to the Internet, therefore reducing the Wi-Fi device connection at the routing end, reducing the routing load, and enhancing the stability of the star architecture.

Figure 6:
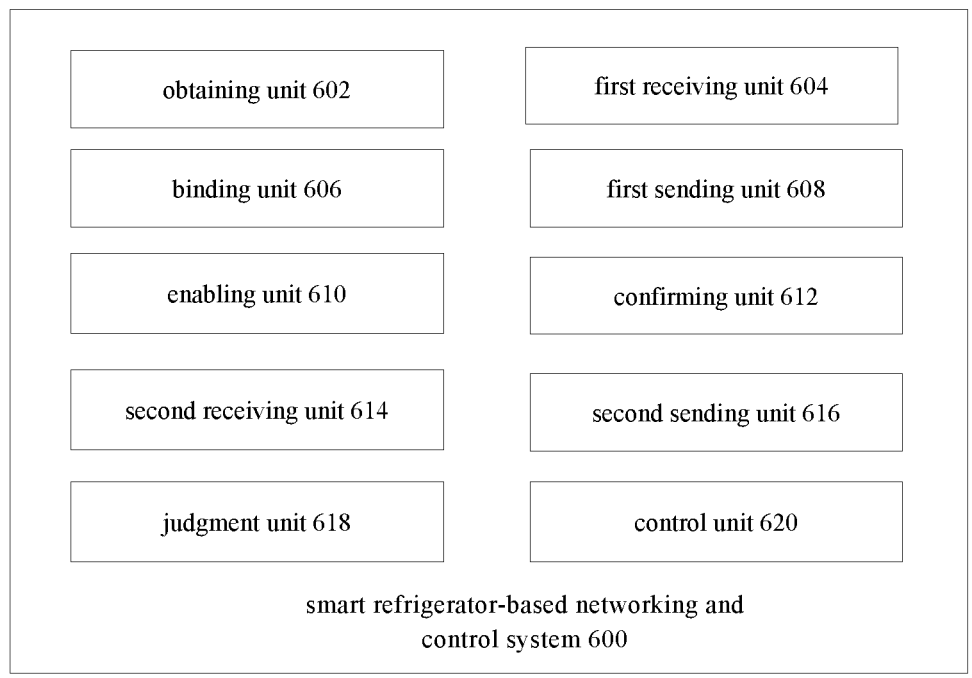
FIG. 6 shows a schematic block diagram of a smart refrigerator-based networking and control system according to another embodiment of the present disclosure.

FIG. 6 shows a schematic block diagram of a smart refrigerator-based networking and control system 600 according to another embodiment of the present disclosure. The smart refrigerator-based networking and control system 600 comprises:

an obtaining unit 602 used to obtain device information of the smart refrigerator;

a first receiving unit 604 used to receive device information and network access request sent by a device to be connected to the network through a Bluetooth assembly;

a bundling unit 606 used to bundle device information of the device to be connected to the network and device information of the smart refrigerator, and generate bundling information;

a first sending unit 608 used to send device information of the device to be connected to the network, device information of the smart refrigerator, and the bundling information to a server, so the server responds to the network access request according to device information of the device to be connected to the network, device information of the smart refrigerator, and the bundling information;

an enabling unit 610 used to turn on the Bluetooth assembly of the smart refrigerator to connect to the Bluetooth assembly of the device to be connected to the network;

a confirming unit 612 used to confirm that the smart refrigerator is a Bluetooth master device connected by Bluetooth;

a second receiving unit 614 used to receive ID information of a registration terminal;

a second sending unit 616 used to send ID information of the registration terminal and device information of the smart refrigerator to the server, to bundle the registration terminal and the smart refrigerator;

a judgment unit 618 used to determine whether a return data of the server is received;

the first receiving unit 604 is specifically used to receive the device information and the network access request sent by the device to be connected to the network through the Bluetooth assembly if the return data of the server is received;

the second sending unit 616 is further used to resend ID information of the registration terminal and the device information of the smart refrigerator to the server if the return data of the server is not received; and a control unit 620 used to receive a control instruction of the registration terminal to control the device to be connected to the network according to the control instruction.

In one embodiment of the present disclosure, optionally, the smart refrigerator-based networking and control system further comprises an enabling unit 610 used to turn on the Bluetooth assembly of the smart refrigerator to connect to the Bluetooth assembly of the device to be connected to the network; and a confirming unit 612 used to confirm that the smart refrigerator is a Bluetooth master device connected by Bluetooth.

In this embodiment, before the smart refrigerator receives device information and network access request sent by the device to be connected to the network through the Bluetooth, first, the enabling unit 610 turns on the Bluetooth assembly of the smart refrigerator to connect to the Bluetooth assembly of the device to be connected to the network. After that, smart refrigerator enters into the process of Bluetooth distribution network connection, the Bluetooth link formation consists of two processes Inquiry and page, each node alternates between Inquiry mode and Inquiry scan mode. The Bluetooth node has the variables WEIGHT, BACK, TIMEOUT, and FHS (File System Hierarchy Standard) packet. The process of connecting to the Bluetooth distribution network connection includes first, the Bluetooth initialization is periodically switched to the Inquiry mode and Inquiry scan mode to discover other devices or be found; second, determining the TIMEOUT value and, after the Bluetooth nodes in the relative mode discover each other, comparing the WEIGHT value, the party with the smaller WEIGHT value passes the FHS packet to the party with the larger WEIGHT value, and enters into the Page scan state. After the party with the larger WEIGHT value receives the FHS packet from the other party, resetting TIMEOUT and continuing to enter into the Inquiry mode or Inquiry scan mode. Repeat until TIMEOUT is 0, entering into Page mode, and confirming the master node. Through the above process of Bluetooth distribution network connection, the confirming unit 612 confirms that the smart refrigerator is a Bluetooth master device connected by Bluetooth, so the smart refrigerator receives device information and network access request of the device to be connected to the network. The smart refrigerator, as a Bluetooth master device connected by Bluetooth, finally implements the control of the device to be connected to the network through the Bluetooth connection.

In one embodiment of the present disclosure, optionally, the smart refrigerator-based networking and control system further comprises a second receiving unit 614 used to receive ID information of a registration terminal; and a second sending unit 616 used to send ID information of the registration terminal and device information of the smart refrigerator to the server, to bundle the registration terminal and the smart refrigerator.

In this embodiment, after obtaining device information of the smart refrigerator, before turning on the Bluetooth assembly of the smart refrigerator to connect to the Bluetooth assembly of the device to be connected to the network, that is, before the smart refrigerator starts to connect to the device to be connected to the network, first, the second receiving unit 614 receives ID information of the registration terminal. The registration terminal can be a smart phone, a computer, a tablet, a wearable bracelet and other terminals, and a control APP for controlling smart home appliances is installed thereon. ID information of the registration terminal and device information of the smart refrigerator are sent to the server, to bundle the registration terminal and the smart refrigerator by the second sending unit 616, to realize the control of the smart refrigerator through the registered smart terminal.

In one embodiment of the present disclosure, optionally, the smart refrigerator-based networking and control system further comprises a judgment unit 618 used to determine whether a return data of the server is received; the first receiving unit 604 is specifically used to receive the device information and the network access request sent by the device to be connected to the network through the Bluetooth assembly if the return data of the server is received; and second sending unit 616 is further used to resend ID information of the registration terminal and the device information of the smart refrigerator to the server if the return data of the server is not received.

In this embodiment, after sending ID information of the registration terminal and device information of the smart refrigerator to the server, to bundle the registration terminal and the smart refrigerator, the judgment unit 618 needs to determine whether the server returns the data for the sent data. If the return data of the server is received, it means the registration of the registration terminal is successful, and the smart refrigerator is successfully bundled, and then the first receiving unit 604 receives device information and network access request sent by the device to be connected to the network through Bluetooth, to realize the control of the device to be connected to the network through the smart refrigerator. If the return data of the server is not received, it means the registration and bundling are not successful. Then the second sending unit 616 resends ID information of the registration terminal and device information of the smart refrigerator to the server, to achieve registration and bundling again.

In one embodiment of the present disclosure, optionally, the smart refrigerator-based networking and control system further comprises a control unit 620 used to receive a control instruction of the registration terminal to control the device to be connected to the network according to the control instruction.

In this embodiment, after the smart refrigerator sends device information of the device to be connected to the network, device information of the smart refrigerator, and bundling information to the server, so the server responds to the network access request according to device information of the device to be connected to the network, device information of the smart refrigerator, and the bundling information, that is, after the device to be connected to the network is connected to the smart refrigerator via BLE and connected to the Internet through a protocol conversion, the control unit 620 receives a control instruction of the registration terminal to control the device to be connected to the network according to the control instruction. So that realized, that the refrigerator controls the device to be connected to the network by one button, the control process is simple, the working efficiency of the device to be connected to the network is improved, and the user experience is improved.

Figure 7:
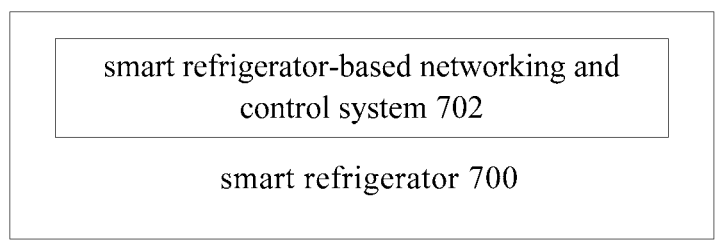
FIG. 7 shows a structure schematic diagram of a smart refrigerator according to an embodiment of the present disclosure.

According to the third embodiment of the present disclosure, providing a smart refrigerator, FIG. 7 shows a structure schematic diagram of a smart refrigerator 700 according to an embodiment of the present disclosure, comprising the smart refrigerator-based networking and control system 702 according to any one of the above-mentioned embodiments.

The smart refrigerator 700 provided by the present disclosure, comprises the smart refrigerator-based networking and control system 702 according to any one of the above-mentioned embodiments, therefore it has all the beneficial effects of the smart refrigerator-based networking and control system 702, and will not be repeated here.

In the description of the present specification, the descriptions of the terms "one embodiment", "some embodiments" and "specific embodiments" and the like, mean that specific features, structures, materials or characteristics described in conjunction with the embodiment(s) or example(s) are included in at least one embodiment or example of the present disclosure. In the specification, the schematic representation of the above terms does not necessarily refer to the same embodiment or example. Moreover, the particular features, structures, materials or characteristics described may be combined in a suitable manner in any one or more embodiments or examples. The terms "connection", "mounting", "fixing" and the like should be understood in a broad sense. For example, "connection" may be a fixed connection, a removable connection or an integral connection; and may refer to direct connection and may also refer to indirect connection through an intermediary. A person of ordinary skills in the art could understand the specific meaning of the terms in the present disclosure according to specific situations.

The descriptions above are only preferred embodiments of the present disclosure, which are not used to limit the present disclosure. For a person skilled in the art, the present disclosure may have various changes and variations. Any modifications, equivalent substitutions, improvements etc., within the spirit and principle of the present disclosure shall all be included in the protection scope of the present disclosure.

The invention claimed is:

1. A smart refrigerator-based networking and control method for a smart refrigerator, comprising:
    obtaining a first device information of the smart refrigerator;
    receiving a second device information and network access request sent by another device to be connected to a network through a Bluetooth assembly;
    bundling the second device information of the device to be connected to the network and the first device information of the smart refrigerator, and generating bundling information; and
    sending the second device information of the another device to be connected to the network, the first device information of the smart refrigerator, and the bundling information to a server, so the server responds to the network access request under a single network ID based on the second device information of the another device to be connected to the network, the first device information of the smart refrigerator, and the bundling information.

2. The smart refrigerator-based networking and control method according to claim 1, wherein before receiving the second device information and network access request sent by the another device to be connected to the network through the Bluetooth assembly, further comprising:
    turning on the Bluetooth assembly of the smart refrigerator to connect to the Bluetooth assembly of the another device to be connected to the network; and
    confirming that the smart refrigerator is a Bluetooth master device connected by Bluetooth assembly.

3. The smart refrigerator-based networking and control method according to claim 2, wherein after obtaining the first device information of the smart refrigerator, before turning on the Bluetooth assembly of the smart refrigerator to connect to the Bluetooth assembly of the device to be connected to the network, further comprising:
    receiving ID information of a registration terminal; and
    sending ID information of the registration terminal and the first device information of the smart refrigerator to the server, to bundle the registration terminal and the smart refrigerator.

4. The smart refrigerator-based networking and control method according to claim 3, wherein after sending ID information of the registration terminal and the first device information of the smart refrigerator to the server, to bundle the registration terminal and the smart refrigerator, further comprising:
    determining whether a return data of the server is received;
    if the return data of the server is received, receiving the second device information and the network access request sent by the another device to be connected to the network through the Bluetooth assembly; and
    if the return data of the server is not received, resending ID information of the registration terminal and the first device information of the smart refrigerator to the server.

5. The smart refrigerator-based networking and control method according to claim 4, wherein after sending the second device information of the another device to be connected to the network, the first device information of the smart refrigerator, and bundling information to the server, so the server responds to the network access request under the single network ID based on the second device information of the another device to be connected to the network, the first device information of the smart refrigerator, and the bundling information, further comprising:
    receiving a control instruction of the registration terminal to control the another device to be connected to the network according to the control instruction.

6. A smart refrigerator-based networking and control system for the smart refrigerator, comprising:
- an obtaining circuit used to obtain a first device information of the smart refrigerator;
- a first receiving circuit used to receive a second device information and network access request sent by a second device to be connected to the network through a Bluetooth assembly;
- a bundling circuit used to bundle the second device information of the second device to be connected to the network and the first device information of the smart refrigerator, and generate bundling information; and
- a first sending circuit used to send the second device information of the second device to be connected to the network, the first device information of the smart refrigerator, and the bundling information to a server, so the server responds to the network access request under a single network identifier according to the second device information of the second device to be connected to the network, the first device information of the smart refrigerator, and the bundling information.

7. The smart refrigerator-based networking and control system according to claim 6, further comprising:
- an enabling circuit used to turn on the Bluetooth assembly of the smart refrigerator to connect to the Bluetooth assembly of the second device to be connected to the network; and
- a confirming circuit used to confirm that the smart refrigerator is a Bluetooth master device connected by Bluetooth assembly.

8. The smart refrigerator-based networking and control system according to claim 7, further comprising:
- a second receiving circuit used to receive ID information of a registration terminal; and
- a second sending circuit used to send ID information of the registration terminal and the first device information of the smart refrigerator to the server, to bundle the registration terminal and the smart refrigerator.

9. The smart refrigerator-based networking and control system according to claim 8, further comprising:
- a judgment circuit used to determine whether a return data of the server is received;
- the first receiving circuit is specifically used to receive the second device information and the network access request sent by the second device to be connected to the network through the Bluetooth assembly if the return data of the server is received; and
- the second sending circuit is further used to resend ID information of the registration terminal and the first device information of the smart refrigerator to the server if the return data of the server is not received.

10. The smart refrigerator-based networking and control system according to claim 9, further comprising:
- a control circuit used to receive a control instruction of the registration terminal to control the second device to be connected to the network according to the control instruction.

11. A smart refrigerator, comprising:
- an obtaining circuit used to obtain a first device information of the smart refrigerator;
- a first receiving circuit used to receive a second device information and network access request sent by a second device to be connected to the network through a Bluetooth assembly;
- a bundling circuit used to bundle the second device information of the second device to be connected to the network and the first device information, and generate bundling information; and
- a first sending circuit used to send the second device information of the second device to be connected to the network, the first device information, and the bundling information to a server, so the server responds to the network access request under a single network identifier according to the second device information of the second device to be connected to the network, the first device information, and the bundling information.

12. The smart refrigerator according to claim 11, wherein the server to be connected to the network connects the smart refrigerator through Bluetooth Low Energy Technology.

13. The smart refrigerator according to claim 11, wherein the second device includes a smart microwave oven, a smart rice cooker, a smart phone, a computer, a tablet, or a wearable device.

* * * * *